US012659920B2

(12) United States Patent
Al-Mufti et al.

(10) Patent No.: US 12,659,920 B2
(45) Date of Patent: Jun. 16, 2026

(54) INTER-SATELLITE-LINK FOR O-RAN BASED NON-TERRESTRIAL NETWORK ACTING AT THE gNodeB

(71) Applicant: Boost SubscriberCo L.L.C., Englewood, CO (US)

(72) Inventors: Khalid W. Al-Mufti, Sterling, VA (US); Mehdi Alasti, Arlington, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 330 days.

(21) Appl. No.: 18/493,059

(22) Filed: Oct. 24, 2023

(65) Prior Publication Data

US 2025/0133533 A1    Apr. 24, 2025

(51) Int. Cl.
| | |
|---|---|
| *H04B 7/19* | (2006.01) |
| *H04W 40/02* | (2009.01) |
| *H04W 64/00* | (2009.01) |
| *H04W 84/06* | (2009.01) |

(52) U.S. Cl.
CPC ......... *H04W 64/003* (2013.01); *H04W 40/02* (2013.01); *H04W 84/06* (2013.01)

(58) Field of Classification Search
CPC ........... H04B 7/18521; H04B 7/18513; H04B 7/18563; H04W 64/003; H04W 40/02; H04W 84/06
USPC ....................................................... 455/428
See application file for complete search history.

(56) References Cited

U.S. PATENT DOCUMENTS

| | | | | |
|---|---|---|---|---|
| 2017/0374596 A1* | 12/2017 | Benammar | ........ | H04B 7/18517 |
| 2023/0199694 A1* | 6/2023 | Ghanbarinejad | .. | H04B 7/18563 |
| | | | | 455/456.2 |
| 2023/0268988 A1* | 8/2023 | Zhu | ........................ | H04B 7/185 |
| | | | | 370/316 |
| 2023/0269685 A1* | 8/2023 | Park | .................. | H04W 56/0005 |
| | | | | 370/350 |
| 2023/0296720 A1* | 9/2023 | Manolakis | ......... | H04B 7/18563 |
| | | | | 455/456.1 |

(Continued)

OTHER PUBLICATIONS

IP.com search History (Year: 2026).*

(Continued)

*Primary Examiner* — Moustapha Diaby
(74) *Attorney, Agent, or Firm* — Seed Intellectual Property Law Group LLP

(57)    ABSTRACT
An Inter-Satellite-Link (ISL) for an Open Radio Access Network (O-RAN) that is part of a Non-Terrestrial Network (NTN). The disclosed embodiment of an O-RAN system makes use of multiple satellite systems in combination with terrestrial based systems in various configurations to carry out the O-RAN system functions. An O-RAN system includes, among other structures and functions, a Radio Unit (RU), a Distributed Unit (DU), and a Central Unit (CU). This disclosure introduces various configuration/hierarchies of using satellites for the hardware and software to carry various portions of the RU, DU and CU in the O-RAN architecture. Various functions of the network can be implemented by satellite, with each satellite providing some level of RU and DU functionality. In one alternative, one satellite in a group of satellites acts as the DU in the form of a router, communicating with other satellites via the ISL, acting as a router.

14 Claims, 12 Drawing Sheets

(56) References Cited

U.S. PATENT DOCUMENTS

| 2025/0070857 A1* | 2/2025 | Dreiling ............. | H04B 7/18539 |
| 2025/0203557 A1* | 6/2025 | Palermo ................ | H04B 7/195 |

OTHER PUBLICATIONS

Polese et al., "Understanding O-RAN: Architecture, Interfaces, Algorithms, Security, and Research Challenges," arXiv:2202. 01032v2 [cs.NI], Aug. 1, 2022, 33 pages.

* cited by examiner

INTER-SATELLITE-LINK FOR O-RAN BASED NON-TERRESTRIAL NETWORK ACTING AT THE gNodeB

TECHNICAL FIELD

This disclosure is in the field of cellular phone communications, and in particular relates to use of an inter-satellite link network as part of a cellular network.

BACKGROUND

As the use of smart phones has increased, so too has the desire for more reliable, fast, and continuous transmission of content. In an effort to improve content transmission, networks strive to improve by providing faster speeds, increased bandwidth, and broader coverage areas. A smart phone also has the ability to communicate with the internet, view video streams, upload videos, and engage in live video sessions, as well as complex multi-user gaming programs. The increase in the number of smart phones, however, has also resulted in increased cellular traffic load. To account for increased traffic load, many networks seek to continuously add additional cell towers, and backhaul equipment as well additional data centers, both regional and national. Building new towers and data centers is expensive and can be time consuming. There are currently many satellites orbiting the earth in a Low Earth Orbit (LEO) that have the ability to communicate with user equipment on the earth that can also be used in the telecommunication system. It is with respect to these and other considerations that the embodiments described herein have been made.

BRIEF SUMMARY

Embodiments are generally directed to systems and methods for dynamically routing cellular communications from a terrestrial user, namely an earth based user, equipment to a satellite, namely a non-terrestrial, system. The satellite system makes use of the Inter-Satellite-Link (ISL) network to facilitate communication between cellular users and carry out on the satellite itself various portions of the O-RAN operations. The satellite functions as part of the gNodeB in a 5G or higher network that provides the connectivity between the various users' equipment that is on the earth.

In particular, embodiments are provided for an Inter-Satellite-Link (ISL) for an Open Radio Access Network (referred to in the art as O-RAN or ORAN) or a Non-Terrestrial Network (NTN). The disclosed embodiment of an O-RAN system makes use of multiple satellite systems in combination with terrestrial based systems in various configurations to carry out the O-RAN system functions. An O-RAN system includes, among other structures and functions, a Radio Unit (RU), a Distributed Unit (DU), (sometimes termed a Distributing Unit) and a Central Unit (CU) (sometimes termed a Centralized Unit). This disclosure introduces various configuration/hierarchies of using satellites for the hardware and software to carry various portions of the RU, DU and CU in the O-RAN architecture. Specific examples of this disclosure provide for various degrees of the network being implemented by satellite such as each satellite providing some level of RU and DU functionality. In one alternative, one satellite in a group of satellites acts as the DU in the form of a router, communicating with other satellites via the ISL, then acting as a router, provides to them CU functionality located on a terrestrial network through ISL communication. Further examples included implementing CU implementation in the satellite configuration, and even putting the entirety of the network (core included) in the satellite constellation.

In one embodiment, the selection of particular functions carried out in each satellite can be dynamically allocated based on the bandwidth, resources available, current and projected location of the satellite as compared to other satellites, the timing of the orbit and other factors.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
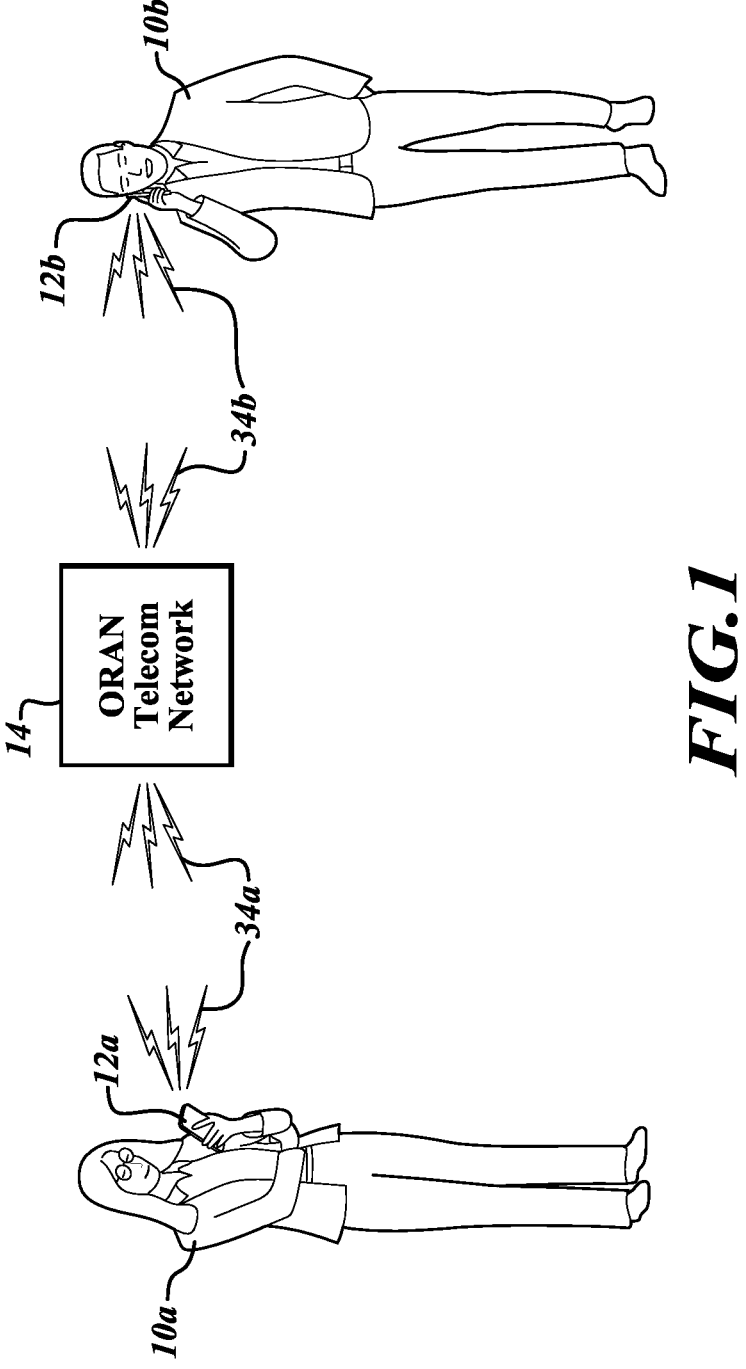
FIG. 1 illustrates two people exchanging data via an O-RAN telecom network.

FIG. 1 illustrates a context diagram of users communicating over an O-RAN network. A first user 10a is communicating using first user equipment 12a with a second user 10b who is using second user equipment 12b via an O-RAN telecom network 14. The users 10a, 10b are provided as examples of a generic user 10 and the user equipment 12a, 12b are provided as examples of generic user equipment 12. The users 10 can be individuals, a group of individuals, corporate headquarters, a conference room, or other user group. The user equipment 12 can be smart phones, smart devices, smart watches, laptops, notebooks, or other user equipment. Both the users 10 and the user equipment 12 are terrestrial based, namely located on the Earth. According to the present disclosure, the O-RAN telecom network 14 has one or more portions that are non-terrestrial based and one or more portions that are terrestrial based. The present disclosure deals with the handling of the O-RAN telecom network 14 having some portions non-terrestrial (NTN) based and other portions terrestrial based, as will now be explained and illustrated in the other figures of the present disclosure.

Figure 2:
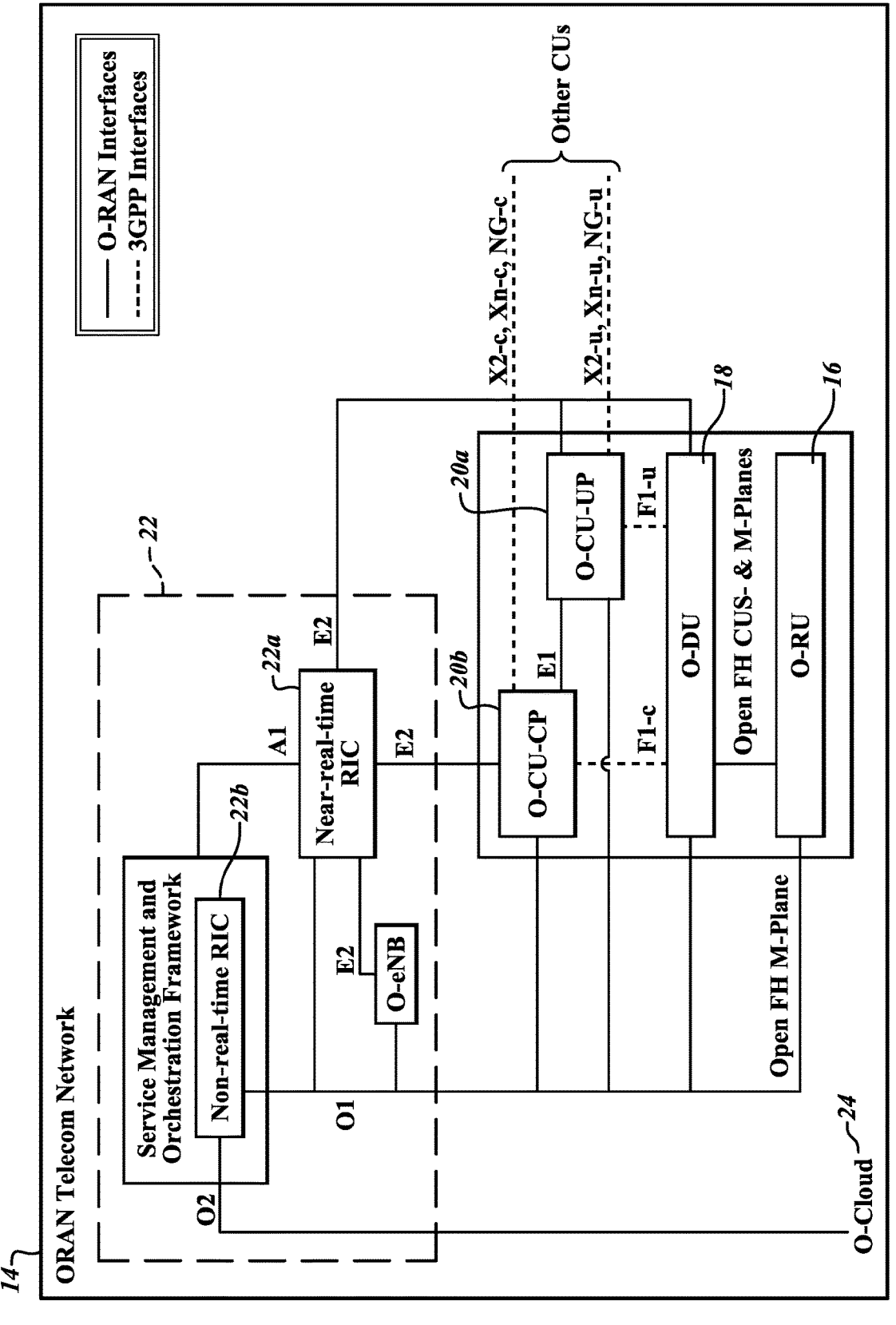
FIG. 2 illustrates the basic architecture of an O-RAN network.

FIG. 2 illustrates various functions, protocols, communication links, and structures of an O-RAN network. The details of an O-RAN network are publicly known and within the skill of a person of ordinary skill in the art. The block diagram of FIG. 2 is a broad outline discussion of such features of the well-known O-RAN network and includes all of the functions, even though some details are not shown since it is an open architecture that is well known in the art, an example of which is in the publication titled quote "Understanding O-RAN: Architecture, Interfaces Algorithms, Security, and Research Challenges," by Michelle Polese et al. The O-RAN network is intended to be an architecture that is provided for use by many entities as a disaggregated network. This means that various functions of the O-RAN network can be carried out by different, unrelated equipment and still maintain communication across the O-RAN telecom network. Broadly stated, the O-RAN network includes a radio unit (RU) 16, distributed unit (DU) 18, (sometimes termed a Distributing Unit), central unit (CU) 20 (CU) (sometimes termed a Centralized Unit), which includeS central unit user plane 20a and central unit control plane 20b and a core 22. Each of the respective units RU 16, DU 18, CU 20 and Core 22 have hardware and software to perform the respective functions of their units. The communication between the user equipment 12 and the O-RAN network 14 is according to a radio unit protocol in order to communicate with the radio unit 16 of the network. The communication between the radio unit 16 and the distributed unit 18 is according to an open FH and M-plane protocol as shown in FIG. 2. The communication links between the distributed unit 18 and the various central plain units are according to an F1 protocol, for example F1-C and F1-U, as is known in the art. The various functions of the central unit communicate with each other via various protocols, including an X2, an XS, and E1 and other protocols. The central unit communicates with a core 22 of the O-RAN network, and the core 22 may include a large number of different functions, for example the RIC functions, including the near real-time RIC 22a and the non-real-time RIC 22b, an AMF function, a UPF function and other core functions, as is well known to those of skill in the art. The core 22 may communicate with a cloud 24 which may include the Internet.

Figure 3:
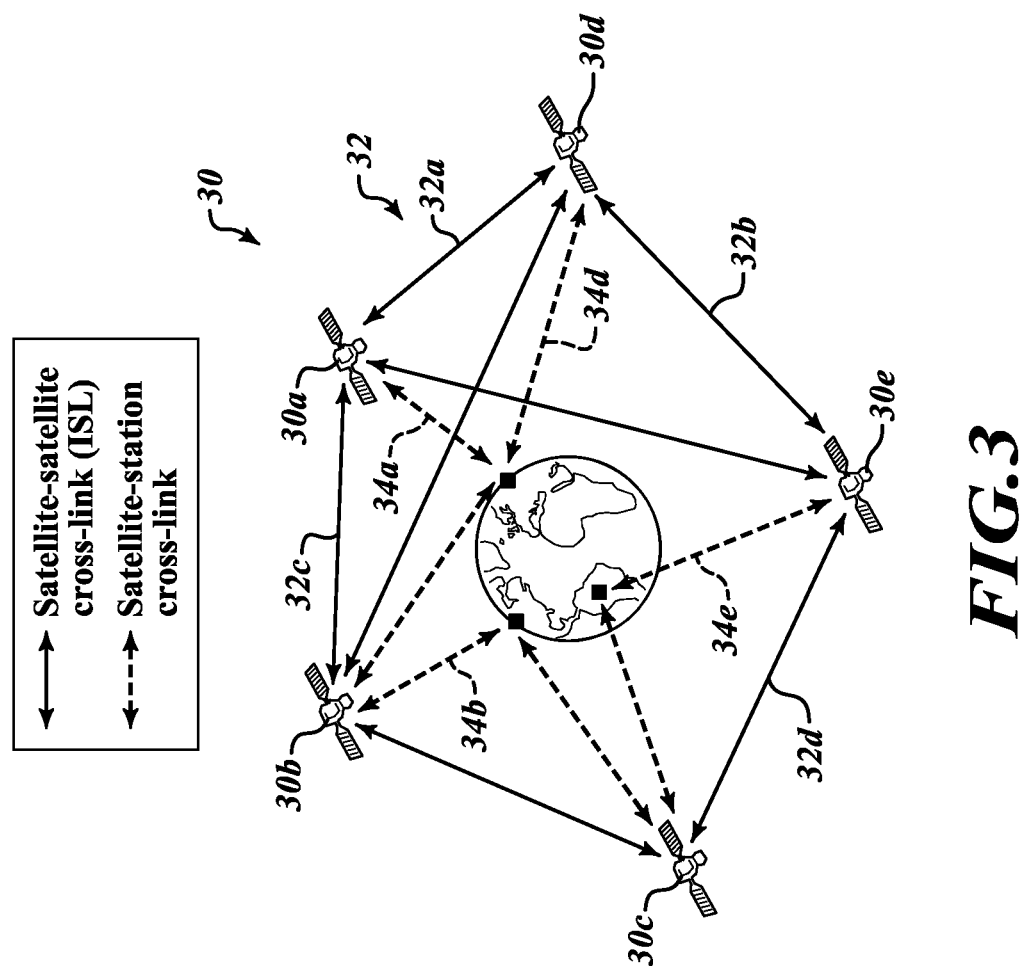
FIG. 3 illustrates Inter-satellite link (ISL) connectivity for use in an O-RAN telecom network.

FIG. 3 illustrates a plurality of satellites 30 that orbit the Earth forming an Inter-Satellite Link (ISL) communication system. In a preferred embodiment, all satellites 30 in the ISL are in a Low Earth Orbit (LEO). A Low Earth Orbit is generally considered between 200 km and 2000 km above the earth. Satellites at this orbital altitude may have an orbital period of between about 90 minutes and 2.2 hours, meaning that satellites orbit the Earth in one complete revolution in about 90 minutes in the lower LEO range and in about 2.2 hours in the higher altitude LEO range. Each satellite will circle the earth within the range of about 12 to 16 times in a single day, from the high to lower orbit distance, respectively. Satellites 30a, 30b, 30c, 30d shown in FIG. 3 are within the LEO distance. The number of satellites in LEO will vary over time as more satellites are launched and some go out of service. The total number of satellites in LEO will usually exceed 1,000 and at various times will be in excess of 3,000 or 5,000. If all satellites 30a-30e available in all orbits are included, this number will often exceed 10,000.

Some satellites have a higher altitude orbiting the earth and are outside of the LEO range, for example, some satellites might be in the range of 10,000 to 25,000 km above the Earth. Such satellites might have an orbital period greater than five hours, and in many instances will have an orbital period in the range of 12 to 15 hours. Using only satellites in the LEO orbits is preferred for the present disclosure based on low latency and fast communication between adjacent satellites, and the description herein applies to such a LEO network, but it is possible that one or more satellites higher than LEO could be members of the ILS and, therefore, examples are provided for completeness. One satellite 30e of FIG. 3 having a higher orbit than the definition of LEO is shown to provide one example. Examples of such satellites 30e include GPS function satellites, Galileo, and other communication satellites. Some satellites 30e are in geosynchronous orbit at 35,786 km above the earth and rotate at a rate of about 24 hours a day, exactly at the same speed as the earth, making one rotation per day to track the exact rotation of the earth, appearing stationary in the sky. If all satellites 30a-30e available in all orbits are included, this number will often exceed 10,000.

As can be appreciated, orbiting satellites maintain a line of sight with a particular fixed terrestrial data point for a selected period of time. Since the LEO satellites orbit the earth in one revolution in less than 2.2 hours, the amount of time in which they are within line of sight of a stationary selected position on earth is relatively short as compared to the amount of time that a satellite with a longer orbital period remains in line of sight communication with a terrestrial based stationary selected position on Earth. A satellite in geosynchronous orbit will have the same line of sight to objects on the earth at all times.

Latency in signal transit times is another factor in communication links 34 between the Earth and satellites. The lower orbit satellite will have a much shorter latency and, thus, signals can be exchanged much quicker between terrestrial based user equipment 12 and the satellites 30. For example, a satellite in LEO orbit will have a round trip latency in the range of about 2.5 to 50 ms, depending on the relative location between the satellite, the line of sight terrestrial based user equipment, and the altitude of the LEO satellite, within the range of 200 km to 2000 km. Signals travel from the terrestrial based location to the satellite along links 34 with the communication from satellites 30a being using link 34a to satellite 30b along link 34b, as shown in FIG. 3. Satellites in the geosynchronous orbit have a signal latency in the range of about 500 ms for communication with Earth based systems, which is too long for many types of live phone and video conferences. Thus, while higher altitude satellites have the benefit of maintaining a line of sight with a fixed Earth location, the higher latency times for signal travel reduce the benefit for use in near instantaneous telecommunication networks. If the data being transmitted is not required to have instantaneous access by the user 10, such as documents being downloaded, video programs such as a movie which can be displayed at delayed time or stored locally then played, higher latency times are acceptable. However, for live video conferences, telephone calls, and instantaneous communication between users 10, having the low latency that is afforded by LEO satellites is particularly beneficial.

Satellites also have an Inter-Satellite Link (ISL) communication system 32 for signal exchange and data transmission between the satellites. ISL transmissions are at a much higher data rate and frequency then currently used and available on terrestrial based systems. For example, the ISL frequency is usually above 12 GHz and often is above 20 GHz, 30 GHz or in some instances is above 60 GHz. This provides for significantly higher data rates, along with greater bandwidth for communication between satellites as compared to communication between terrestrial based radio systems at much lower frequency. Further, the latency between adjacent LEO satellites can be quite low, approaching zero seconds, and often under 1.0 ms or under 0.1 or 0.01 ms, depending on the relative location of the satellites to each other as each orbits the Earth. Thus, the ISL links 32a, 32b, 32c, 32d will frequently have low latencies and permit a signal transmitted from a terrestrial based location to a first satellite 30a, then data exchanged via the ISL 32a with satellite 30d, and then the information is exchanged with the Earth from satellite 30d using terrestrial link 34d and satellite 30e using terrestrial link 34e.

The ISL therefore provides low latency and high communication rates with high bandwidths between various orbiting satellites which permits low latency communication between terrestrial based users 10 using a combination of Earth-to-satellite links and satellite-to-satellite links.

Figure 4:
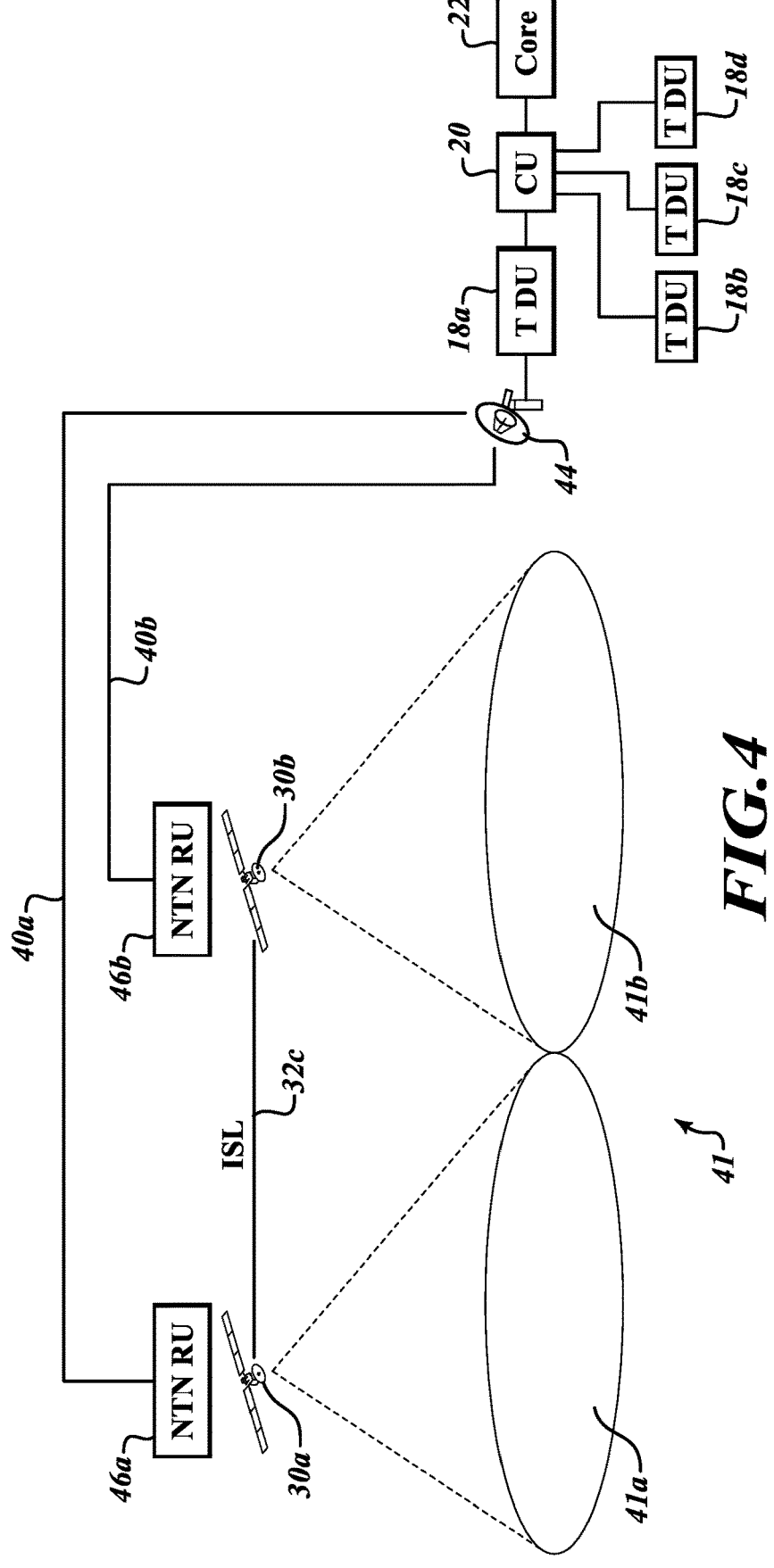
FIG. 4 illustrates the Radio Unit functions being carried out in the satellite constellation

FIG. 4 illustrates the first embodiment according to the disclosure of very basic communication between two users 10 using user equipment 12. Each satellite 30 has a selected line of sight coverage 41 on a terrestrial surface. In particular, a first line of site area 41a on Earth has a large number users 10a, which with user equipment 12b, while are large number of second users 10b are within the line of sight service area 41b for satellite 30b. A signal is sent from the user equipment 12 within the respective line of sight 41 to the respective satellite 30 using the RU protocol of O-RAN network. After the information reaches the satellite 30 in a non-terrestrial orbit using RU-based equipment 46 in the satellite, it is transmitted over fronthaul interface lines 40a to an Earth based transmitter and receiver 44 which then passes the information to terrestrial based DU equipment 18a, which then communicates with a centralized unit 20 also located on the earth. In addition to the DU 18a that receives signals via fronthaul lines 40a, 40b the CU 20 receives signals via terrestrial based DU systems 18b, 18c, 18d. This information is managed by CU 20 along with exchanges between the core system to permit data exchanges between the various users 10 in all parts of the telecom network 14. The core 22 is provides other functions as needed. In addition, the CU 20 and Core 22 can each be part of or coupled to the Cloud and the internet, which are considered present on the Earth in each embodiment, but are not shown in all figures for ease in illustration. These are consider available and present at different locations in each of the systems of the present embodiment and can in fact have some of their hardware and functions in the satellites 30.

Figure 5:
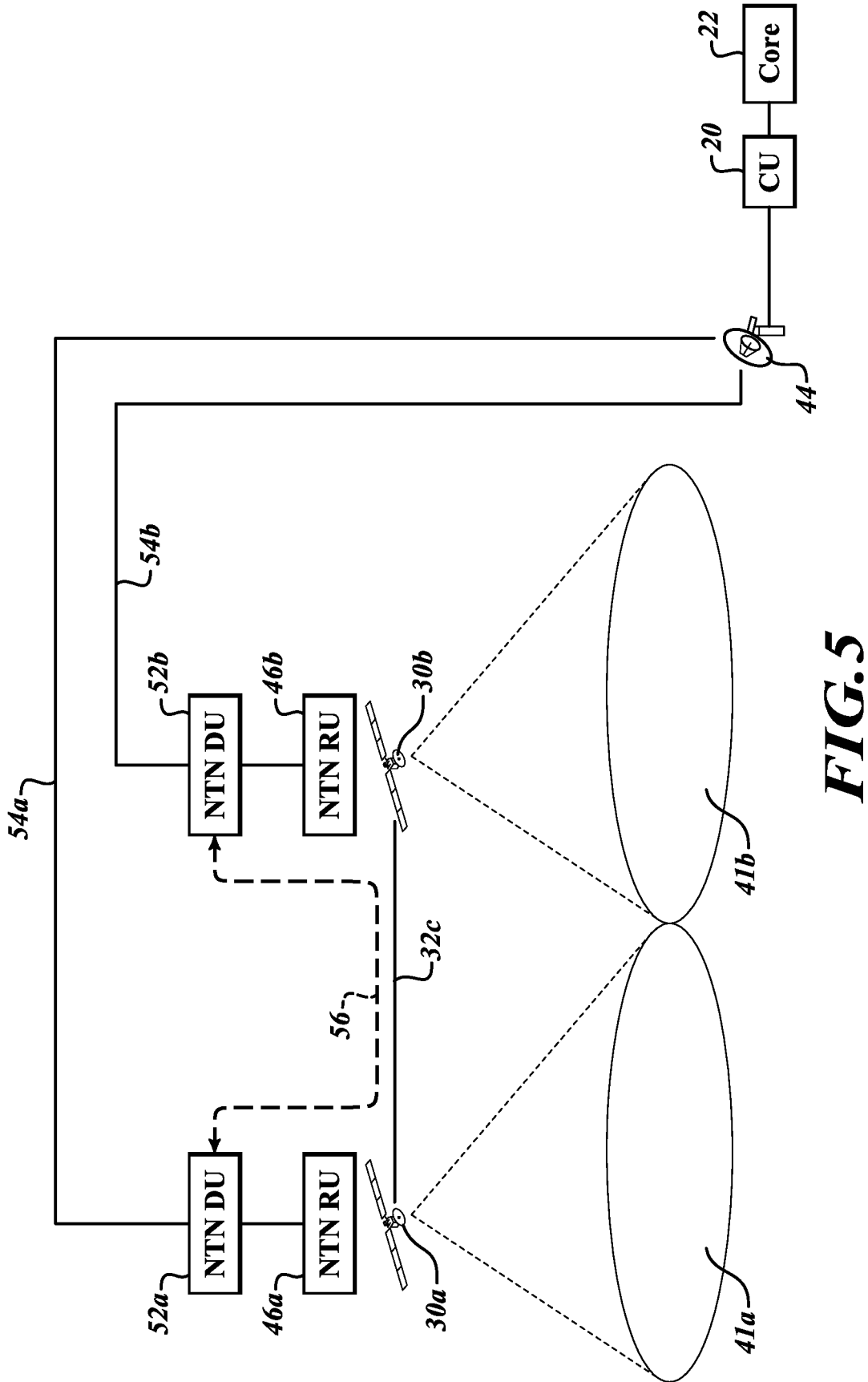
FIG. 5 illustrates the ISL carrying out both the Radio Unit and Distributed Unit functions.

FIG. 5 illustrates an embodiment in which the ISL will carry out the distributed unit functions in the respective satellites 30a, 30b. In particular, each satellite 30a, 30b includes a non-terrestrial network (NTN) radio unit 46a, 46b and, in addition, within the satellite is the hardware and software to carry out the distribution unit function in a non-terrestrial network (NTN) environment with the NTN DU 52a, satellite 30a, and the NTN DU 52b in satellite 30b. Specifically, the functions of the distributed unit 18 as shown in FIG. 2, which is normally based on the ground in a terrestrial network, is positioned within the respective satellites 30. The DU 52 carries out the various functions of the physical layers as well as the RLC, MAC, and other parts of the telecom network that provide the real-time physical layer and the lower layer. For example, the physical layer may include scrambling, modulation layer mapping pre-coding, and easy mapping. The DU 52 also carries out the M-plane functions. Another particular benefit of having the DU 52 in the same satellite and in the same hardware configuration with the RU is that the transfer functions between the RU hardware and the DU hardware can take place instantaneously. These include the CU-plane, the S plane and the M-plane communication protocols between these two functions of the telecom system. The DU 52 also contains the data link layer and the scheduling functions carried out physically close to the RU in order to provide speed and operations within the same respective satellite. Thus, significant benefits are obtained by having the RU 46 and the DU 52 contained in the same satellite 30 and based in the same hardware frame. In addition, the two users in each of the respective line of sight areas 41a, 41b will have communications directly between the respective DU units in order to coordinate the interaction. This communication between the respective DU units 52a, 52b are carried out with an intersatellite communication link 56. In this instance, the intersatellite link communication will enhance the intra-GNB handover, which is an inter-DU. In addition, the hardware in the two respective satellites 30 can assist each other in carrying out a number of the functions of the DU. This can specifically include an exchange of data along line 56 as part of the data link layer and the scheduling function, as well as the lower layer L2. Thus, the physical layer that interacts directly with the radio unit output will be positioned on the same satellite as the RU 46, as will the MAC functions and the RLC functions. In addition, each respective DU 52 in the satellite will communicate over an F1 lines 54a and 54b, jointly lines 54, to a Earth based transmitter and receiver 44 to perform some of the functions of the ground-based central unit 20. As shown in FIG. 5, some parts of the communication, having been transferred over F1 lines 54 will enter the centralized unit 20 in which various centralized unit functions will be carried out, such as the RRC communication to the core to carry out the core control plane and the PDCP for communication with the core user plane. The centralized unit 20, therefore, carries out the centralized functions from the respective DU 52 from the satellites and exchanges the information back to the satellite on the F1 interface protocols 54.

Accordingly, shown in FIG. 5, a portion of the DU communication is handled fully in the intersatellite link 56, thus, having near zero latency between them, very high bandwidth and high data exchange rate between adjacent satellites 30. Those portions of the communication which need to be handled by the central unit and the core 22 will be transferred via the F1 links 54 to the Earth based transmitter and receiver 44 for handling of those functions in terrestrial based CU 20 and core 22.

Figure 6:
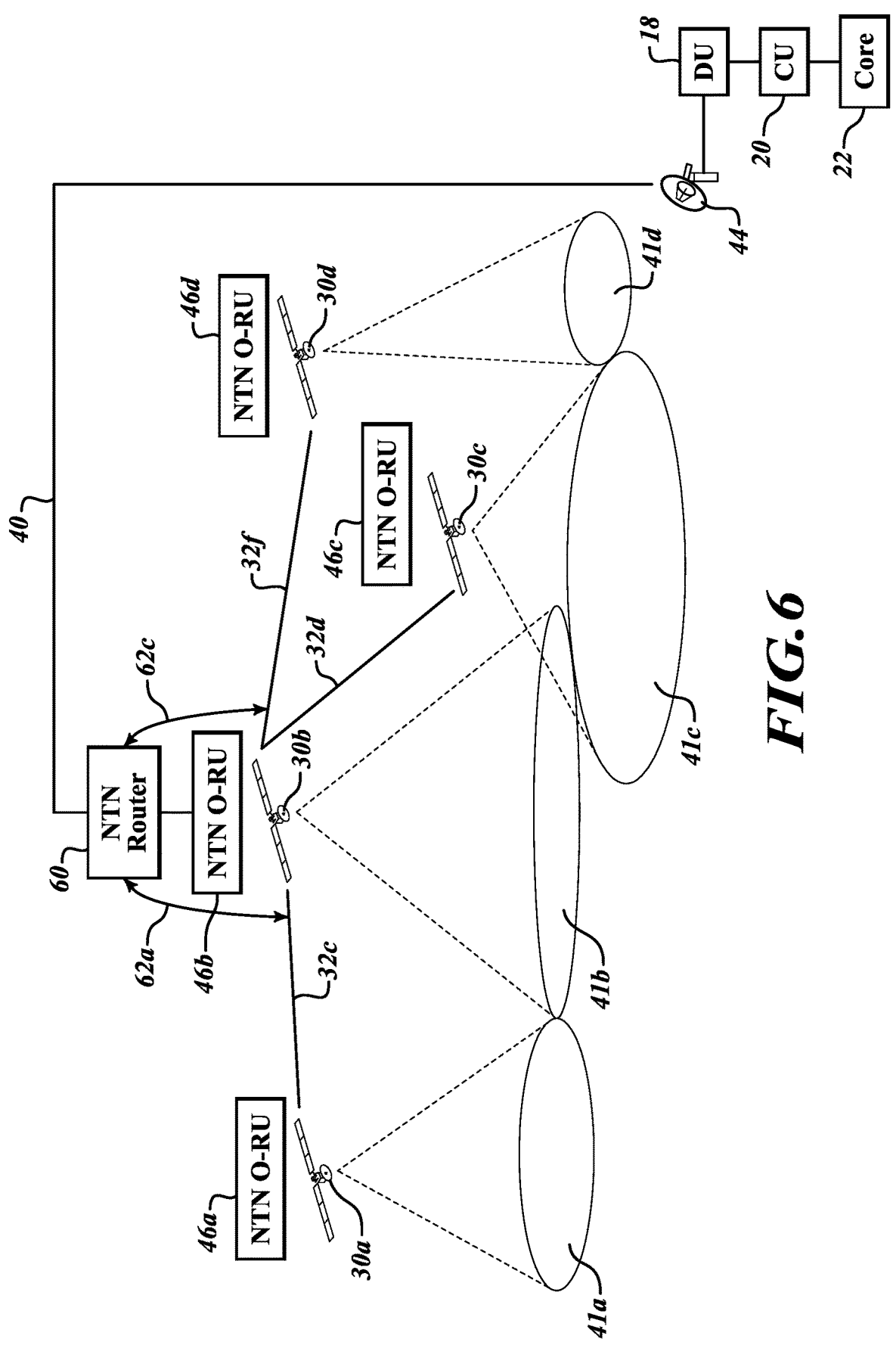
FIG. 6 illustrates the ISL carrying out portions of the Radio Unit and fronthaul interface functions with a satellite router.

FIG. 6 illustrates the example of using a single satellite router with multiple radio units located in multiple satellites. In particular, a large number of satellites, in this instance 30a-30d are provided, which each cover a line of sight area 41a, 41b, 41c, 41d. The line of sight for these various satellites may be a majority of the Earth's surface, with the portion being within line of sight of satellite 30d in a different hemisphere from those in the line of sight of satellite 30a. An intermediate satellite, 30b, is a thin line of sight of both satellite 30a and satellite 30b and, therefore, can be a central communication link for each of the satellites. In this embodiment, shown in FIG. 6, each of the respective radio units in the satellites 30a-30d received signals from the various users in each of the respective areas 41a-41d. Further, the information in each one of these line of sight service areas is transmitted via ISL32 using a fronthaul protocol to a satellite 30b which is within line of sight of each of the respective satellites 30a, 30c, 30d even though none of satellites 30a-30d are within line of sight of each other. Namely, satellite 30a communicates with satellite 30b through fronthaul interface 32c using an ISL communication where satellite 30c uses fronthaul interface via ISL 32d and satellite 30d uses fronthaul interface protocol 32f. In addition, satellites 30b, 30c and 30d each includes their own respective RU unit 46b, 46c and 46d which is a non-terrestrial (NTN) radio unit that directly communicates with users within its line of sight area 41b.

After all of these signals are received by satellite 30b, they are transferred to a radio unit router 60. The radio unit router 60 can be in at least two different locations. In a first embodiment, the radio unit router 60 is within the satellite 30b itself. Specifically, the router 60 is within satellite 30b and directly connected to the radio unit 46b and receives signals within the satellite 30b. In another embodiment, the NTN router 60 is located in a different satellite, which orbits higher than and, thus, has a longer orbit than satellites 30a-30d. This additional satellite can carry the router which receives, via radio links 62a, 62c, the RU signals from each of the respective satellites 30a-30d. This router 60 collects the data from each of the respective satellites and then, using a fronthaul interface transmits, information to a single Earth based transmitter and receiver 44 which transfers the information to ground-based DU 18, CU 20, and core 22.

The structure of FIG. 6 provides a number of advantages. The first advantage is that fewer earth stations are needed to provide the non-terrestrial (NTN) coverage over a large area, namely instead of needing a Earth based transmitter and receiver 44 for each of the satellites 30a-30d, instead a single Earth based transmitter and receiver 44 can receive data which has been collected from a number satellites which are out of line of sight from the receiver. In this example, areas 41a, 41d may be on opposite sides of the earth, and viewing different hemispheres but still have a line of sight communication with a satellite 30b which has a line of sight communication with the Earth based transmitter and receiver 44. Another advantage is that the complexity of the satellite communication is lower and therefore less technology is needed on each satellite. The majority of the satellites are implementing simply the RU functionality and a single satellite has a router provided. As can be appreciated, a LEO system of satellites can have a first set of satellites which include only the RU function and a second set, with fewer satellites which include the router function within the satellite. Thus, the cost of providing a router to each satellite can be saved and the router function can be provided to only a few of fewer number satellites, for example 10% of the satellites. If the router function is present in approximately 10% of the LEO satellites, this will be a sufficient number so one of them will always be within line of sight of a designated Earth based transmitter and receiver 44 and will also be within line of sight of several, perhaps several dozen or several hundred other satellites 30. A further benefit that has been pointed out is that the Earth based transmitter and receiver 44 may not have line of sight with a particular satellite 30 but would still have the perfect ability to provide telecom network coverage, such as cell coverage, to the user equipment within that particular area. Thus, user equipment which is not within line of sight of particular satellite could still have full cell coverage provided.

Figure 7:
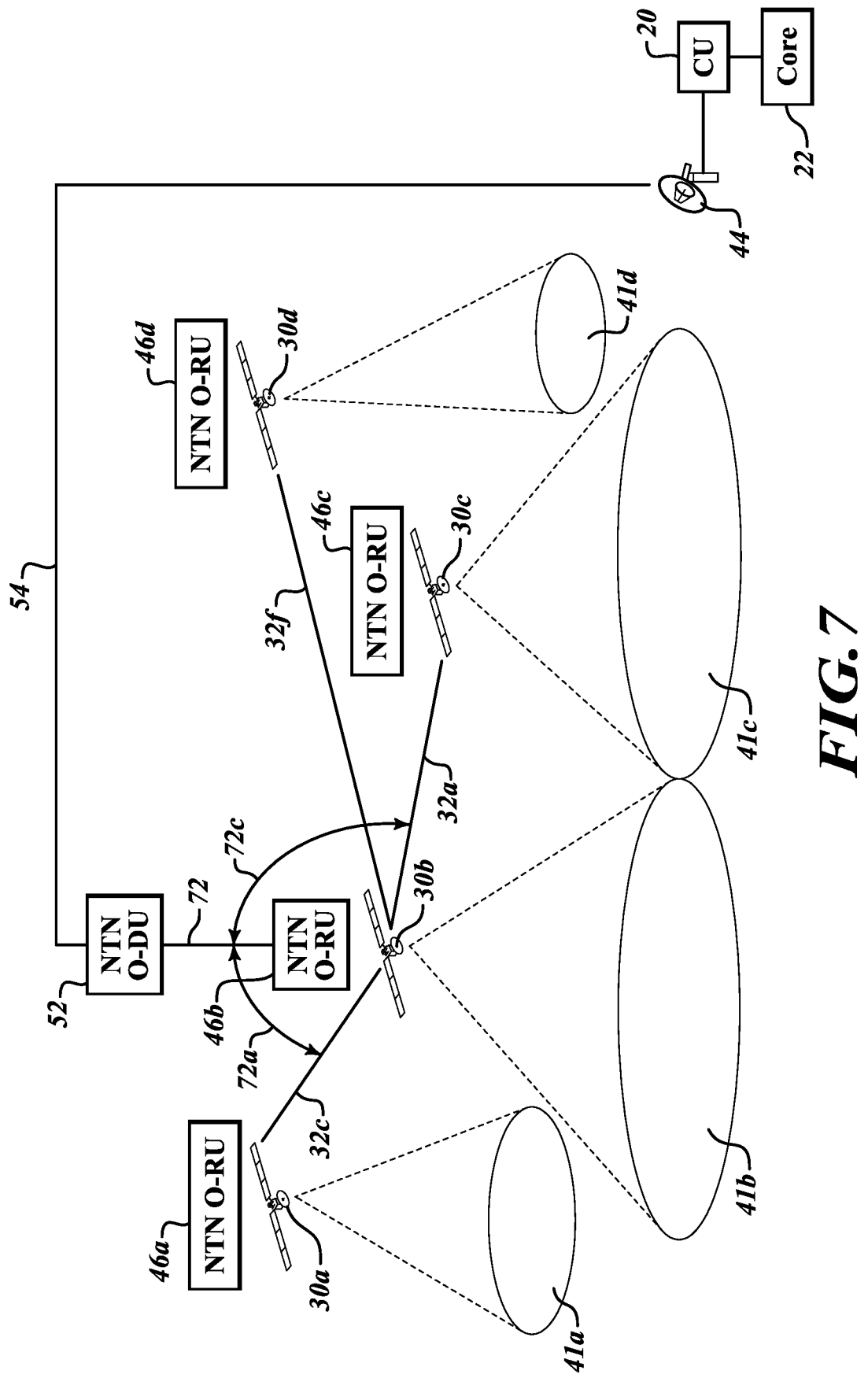
FIG. 7 illustrates multiple ISL radio units with a single satellite distributed unit.

FIG. 7 provides an embodiment in which a single satellite 30b has the hardware and software thereon to carry out both the RU and DU functions, but other satellites do not have the hardware and software for the DU function. Accordingly, satellites 30a, 30c, 30d interact with user equipment 12 within their respective line of sight 41 and then exchange this information with a single satellite 30b which performs the DU function on all of the information from three or more satellites as well as from its own satellite. Accordingly, various non-terrestrial O-RU hardware 46 will exchange information with the single satellite 30b in which the DU function is also performed for all of this information and then it is exchanged on an F1 interface line 54 with the Earth based transmitter and receiver 44. On the ground, the CU function 20 and the core 22 are carried out and the information is exchanged along F1 interface 54 with all of the satellites, with the DU function exchanging the information with each of the satellites for which it has a line of sight communication link.

One advantage of this arrangement of FIG. 7 is that fewer Earth based transmitter and receivers 44 are required for the satellite coverage area, therefore larger cell areas can be provided and more cell areas can be covered. Another advantage is the complexity of all satellites is substantially reduced to only a low percentage, for example 10% of the LEO satellite cluster needs to have the DU function hardware and software present therein. A satellite which has only the RU function can exchange identifying information with all satellites within its line of sight and easily identify satellites which have a DU function capability. It can then set up an intersatellite link communication with that satellite to exchange the data from its radio unit to the DU 52 within that satellite. There will usually be in excess of 3000 satellites in LEO and according to the embodiments of FIGS. 6, 7 and 8, yet if fewer than 10% have the additional functions of a router or a DU, then they system can operate properly and also save significant costs in production and launching costs and operation costs. A satellite having only the RU will be lighter in weight and consume less power than one having the full DU plus a router, which will also be lower cost than one have the full CU plus a router. Thus, the number of satellites 30 that have the RU and DU can selected and set a lower number than all satellites in the operating system.

Figure 8:
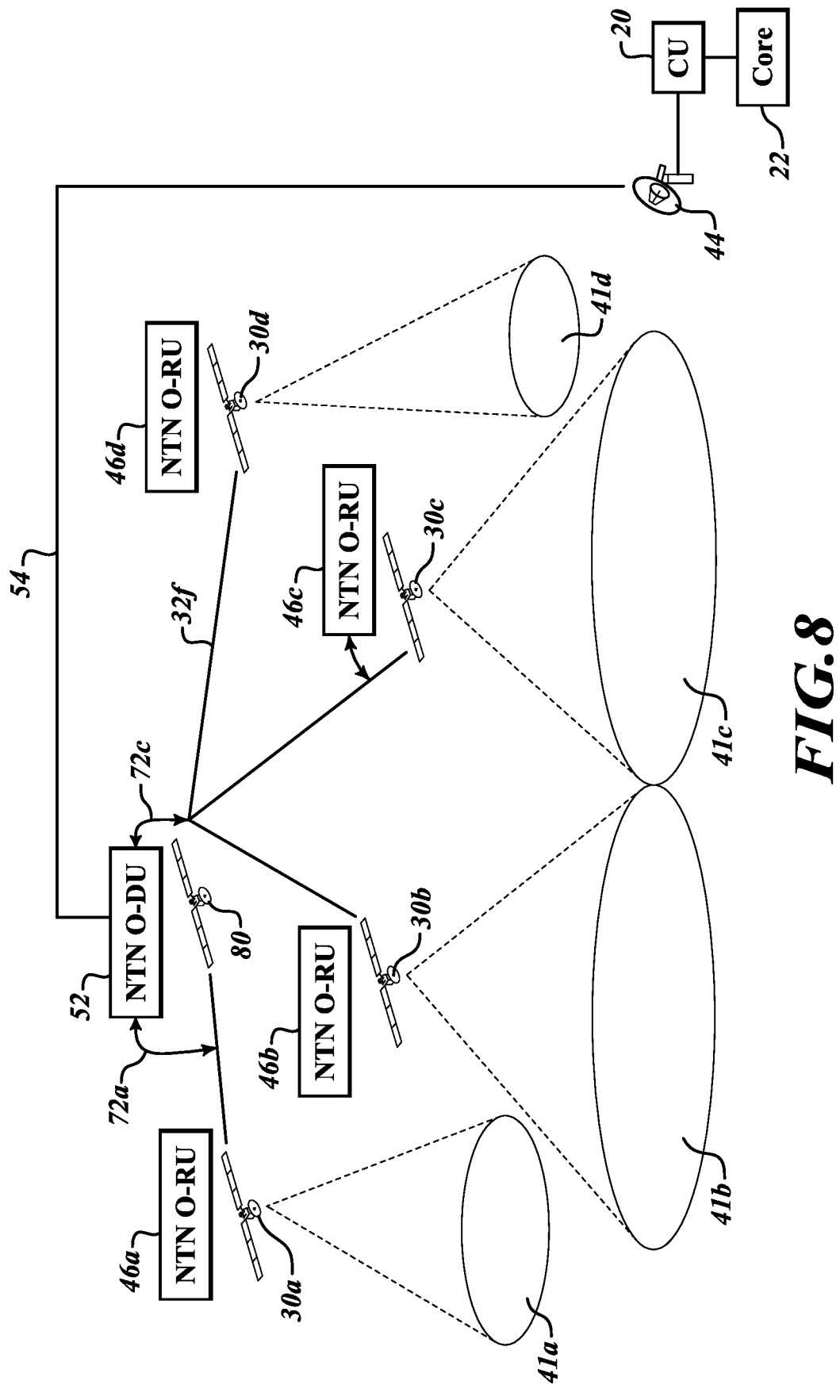
FIG. 8 illustrates another embodiment of multiple ISL radio units with a split ground and satellite distributed unit.

In one alternative embodiment of FIG. 7, the NTN DU 52 can be in a separate satellite in a LEO orbit or different orbit, such as 30e and the data transmitted to it via lines 72, 72a and 72b, one example of which is shown in FIG. 8.

FIG. 8 illustrates a particular embodiment of the present disclosure in which a satellite 80 contains only the DU function and does not contain any RU function. Data is exchanged with satellite 80 using lines 72, such as 72a and 72b, in the ISL. This satellite 80 can be within the LEO satellite cluster or, alternatively, it can correspond to satellite 30e of FIG. 3 which is outside the LEO cluster, or it can be a completely different satellite at a much higher orbit and, thus, have line of sight capability with numerous, perhaps over 100 or a few hundred, LEO satellites 30. For example, the satellite 80 may be in a higher orbit and, thus, have a period somewhat less than a GPS satellite, for example, it may have an orbit in the range of 4,000; 6,000; 8,000; 10,000; or 12,000 km, below that of the GPS orbit but somewhat higher than an LEO orbit. In this particular embodiment, the satellite 80 is dedicated solely to carrying out the DU function of the O-RAN network. It does not contain an O-RU capability. Therefore, a cluster of LEO satellites 30a-30d, which have line of sight vision to the Earth, exchange information with various user equipment 12 and exchange this information with the DU 52 in the satellite 80. The satellite 80 therefore exchanges information along the F1 interface 54 with the Earth based transmitter and receiver 44.

A number of advantages are provided by the structure of FIG. 8, among them that fewer Earth stations are needed to provide the NTN coverage for a very large area. The orbital altitude of satellite 80 can be selected based on a number of factors, including a desire for low latency, but also to have a longer period and to cover a larger area of the Earth at any particular moment in time. Thus, trade-offs will be made to select an orbit altitude that provides the desired low latency which may be near or slightly higher than LEO orbit but also has a longer period and, thus, maintains a line of sight view with the same Earth based transmitter and receiver 44 for a longer period of time and, thus, may be in an orbit in the 4000 km or perhaps 6000 km range that will have a longer period to provide longer coverage with fewer Earth based transmitter and receivers 44 and yet have low latency with satellites 30 in the LEO constellation. As previously mentioned with respect to other embodiments, this provides the other benefit that the majority of the satellites contain only the RU hardware and software functions and, thus, are lower cost, lower power, and simpler in their functionality. Further, only a single satellite 80 contains the DU function and, thus, also has lower complexity and lower cost than if it contains both RU and DU functions. Thus there is a reduced complexity of all satellites provided with the embodiment of FIG. 8. A further benefit is that the Earth based transmitter and receiver 44 may not have line of sight coverage with a number of the RU satellites 30, but would still have the ability to provide cell coverage to user equipment 12 in each one of the service areas 41 because the satellite 80 having the DU function is at a higher altitude and can provide a single communication link 54 with many satellites 30.

Figure 9:
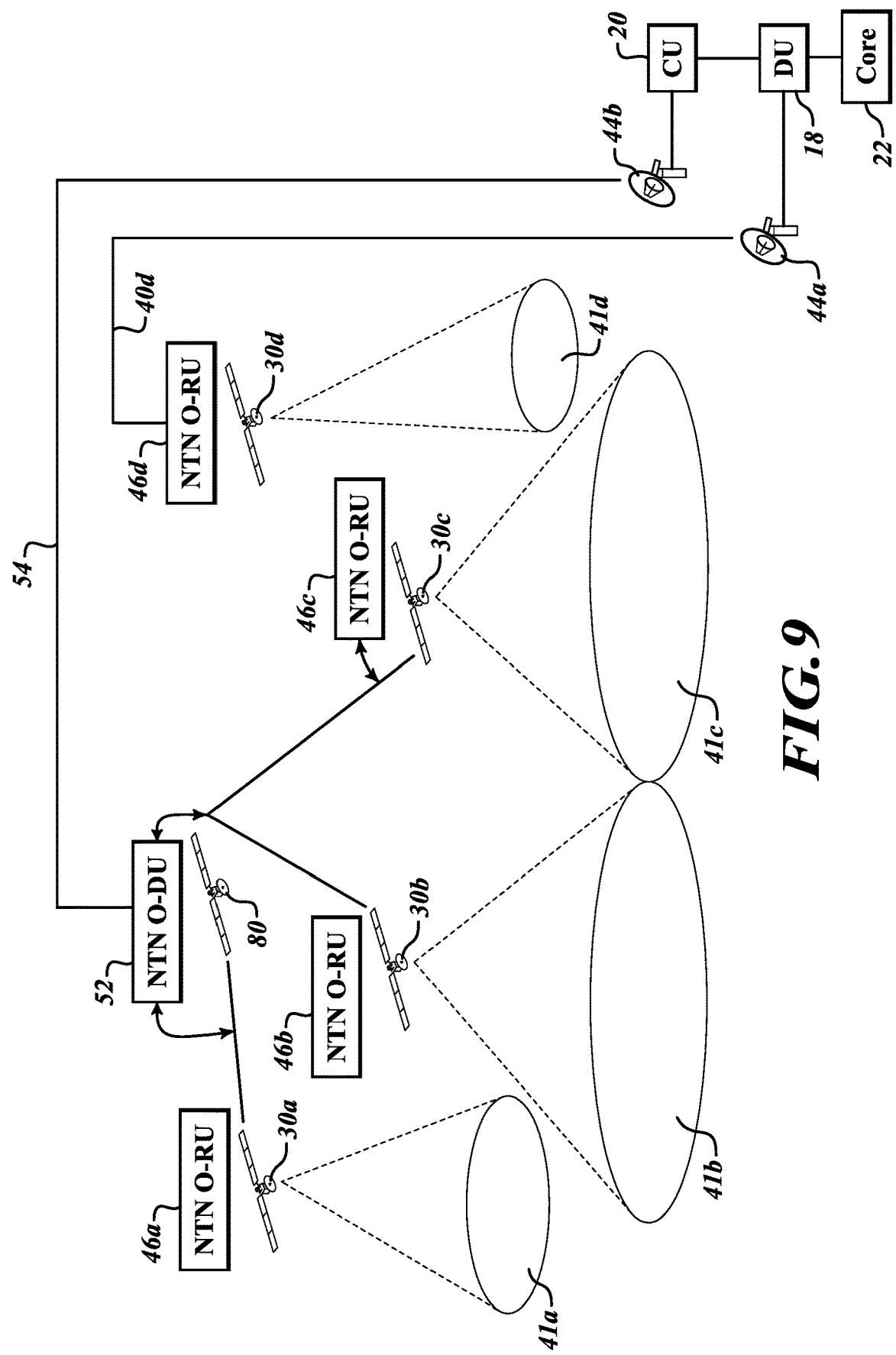
FIG. 9 illustrates another embodiment of multiple ISL radio units in a single satellite distributed unit.

FIG. 9 provides an embodiment in which one or more satellites 30 are able to make use of their own dedicated communication fronthaul interface 40d to a separate Earth based transmitter and receiver 44a while a group of satellites 30a-30c interact with the fronthaul interface using ISL to a satellite 80 which communicates using the DU protocols on the F1 line 54 to another Earth based transmitter and receiver 44b, or in some instances to the same Earth based transmitter and receiver 44a. As shown in FIG. 9, if the signal received at the Earth based transmitter and receiver 44 is an RU protocol signal with the fronthaul interface, then a link can be provided to an Earth based DU 18 which interacts directly with the Earth based CU 20 which exchanges data with the core 22. Data can be exchange from the core 22 via the CU 20 or, depending on the location of the various user equipment 12, can pass directly to the DU 52 in the satellite 80, or can be passed through the DU 18 based on the Earth and then via the Earth based transmitter 40 before being provided to the appropriate satellites 30d and others which are transmitting using only the RU unit.

The embodiment of FIG. 9 provides a number of significant advantages and benefits and, thus, can be used in as a hybrid model in combination with the embodiment of FIG. 8. As the satellites 30 orbit the Earth, at a first selected time the satellite 30d may be in line of sight communication with the dedicated DU satellite 80 and therefore exchange information using the low latency, high bandwidth and high data rate ISL line 32f. As the satellite rotates, it may lose line of sight capabilities with satellite 80, but still be within the line of sight capability of Earth based transmitter and receiver 44. Accordingly, the satellite 30d can immediately transition to communication with the exchange of data for users in its line of sight area 41d and communicate directly with Earth based transmitter and receiver 44a and use a local Earth based DU 18 which will exchange data with the Earth based CU 20 which will then exchange information with the satellite-based DU 52 and continue exchanging data with DU 52 seamlessly as was being carried out in FIG. 8. Accordingly, the users 10 can continue seamless communication as the satellites orbit the Earth, at one point in time a number of satellites exchanging data between themselves and using the same DU 52 on the F1 line 54 and then at a second selected time having one or more of the links B through the RU unit of the satellite 30d but still maintaining exchange of data through the ground-based systems that have a link through F1 line 54 to the DU 52 and, thus, maintain a seamless exchange of information with any users in the various areas 41a-41c.

Figure 10:
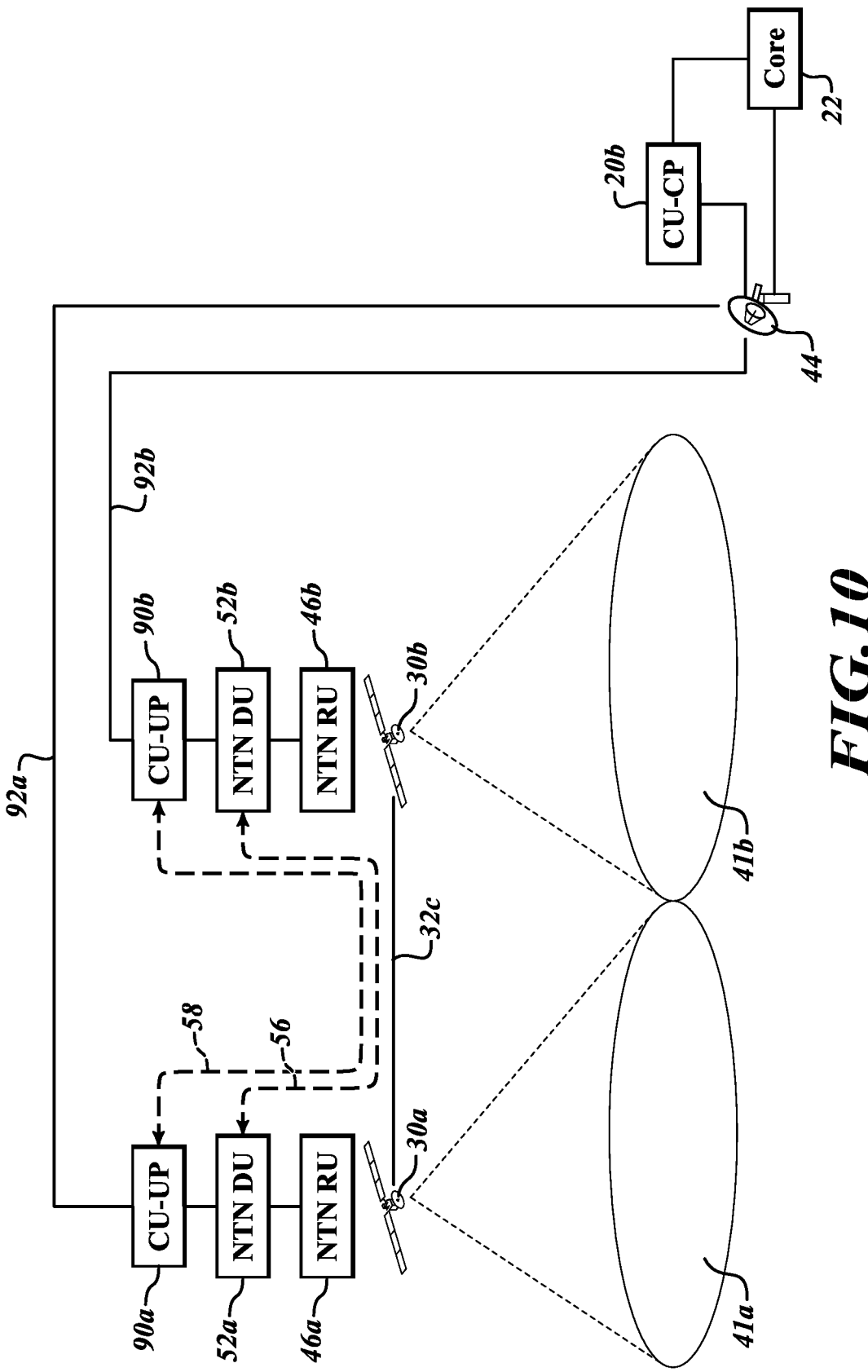
FIG. 10 illustrates the ISL having the Radio Unit, Distributed Unit and Centralized Unit, with some portion of the centralized unit on the Earth.

FIG. 10 illustrates yet an additional embodiment in which one or more satellites 30a, 30b each contain all portions of the RU 46, the DU 52, and some portions of the CU 20. One of the benefits of the disaggregated O-RA and architecture is that the CU 20 can be disaggregated into various physical structures and at different physical locations. For example, the CU 20 includes a user plane and a control plane. The user plane includes various functions including SD AP, PDC P and various other functions. These user plane functions can be more easily carried out directly adjacent to and in close communication with the DU 18. Accordingly, the satellite 30 contains all parts of the DU in the respective hardware 52a, 52b and some portion of the CU, labeled 90a, 90b in, for example, the user plane and other portions of the CU 20 are on Earth based locations, shown as 20b, which is connected to the Earth based transmitter and receiver 44. Accordingly, the function of the F1 user plane is located within the satellite 30 and there is a direct user plane communication between the DU 52 and the CU 90 for the user plane functions and interface. The F1 control planes, F1c is communicated along lines 92a, 92b to the Earth based transmitter and receiver 44 and the functions of the CU control plane are carried out in the terrestrial based portion of CU, which is CU-CP 20b. In this embodiment, the ISL has various communication links 56 between the DU units 52a, 52b and, thus, provides very low latency and high bandwidth communication for this exchange of information. In addition, some of the CU communication links, such as the X-NU interfaces occur between the CU 90a, 90b along communication link 58 using the ISL communication signals. This also saves significant time because of the low latency of the ISL network as well as providing very high bandwidth and large data rates. This can enhance the intra-gNB for the inter-DU communication and also for the inter-CU handovers. A further benefit is that the complexity including the cost and power consumption of the respective satellites 30 is kept within a manageable limit. Only a portion of the CU function is carried out in each satellite and this can be limited based on the hardware availability as well as the power available at a particular time.

As noted, there will usually be in excess of 3000 satellites in LEO and according to the embodiment of FIGS. 7-9, only about 10% need to have the additional functions of a router or a DU or part of the CU. In one embodiment, the selection of particular functions carried out in each satellite can be dynamically allocated based on the bandwidth, resources available, current and projected location of the satellite as compared to other satellites, the timing of the orbit and other factors. In one embodiment, the system contains hardware and software to track the usage, bandwidth, latency, current connections and projected connections of each satellite 30 that is participating in an exchange of information. The particular functions carried out on each satellite are dynamically altered based on each of these factors. If a particular satellite has sufficient bandwidth and low latency, it can be used to one or more of the functions the NTN DU 52 and/or NTN CU 90. But, if the latency increases, the satellite is about to move out of the line of sight of the earth receiver 44 or the bandwidth is taken up by other resources, this very same satellite can switch to perform only the RU function and the can transfer the DU and CU functions to the earth.

FIGS. 8 and 9 provide examples of how this can be done. At one time satellite 30d can be part of the same network as 30a-30c and exchange data with them. As each of the satellites move, then satellite 30d can move from it link in FIG. 8 to a separate link as shown in FIG. 9. In addition, the identity of the satellite acting as 30b or as 80 can dynamically change. At one time, satellite 30b may act as satellite 80, but this can change to be satellite 30c, 30d or even 30e that is not in a LEO. The latency of the signal is constantly monitored and if it falls below a selected threshold then more functions can be sent to ground or the satellites functioning as RU, DU and CU can be changed.

In one embodiment, the latency priority of the information exchange is determined, stored and routed based on this factor. For example, the signal can carry within it a latency ranking, such as a low required, medium permitted or high preferred. A low latency need ranking would be for live phone calls, zoom calls and the like while a medium ranking might be used for some text messages, social media exchanges or posting and other communication and low for viewing movies, video content, some social media videos, such as Facebook, TikTok, Instagram and the like. Social media can include many images and video data. The system will monitor the data stream and determine whether the information being exchanged includes such images and video and also whether they are part of a social media posting or exchange, which will have a flag added to provide high latency. In addition, the amount of bandwidth used and amount of data being transferred will be monitored, which will also give the information a low priority for communication. For information that has a low priority for exchange, this can be routed from LEO satellites 30a and 30b to satellites 30e that are in a much higher orbit. In addition, the information can be routed from the high orbit satellites 30e to earth and back to one or more LEO to exchange the data with a speed and using available bandwidth that is acceptable for that type of information and data.

Figure 11:
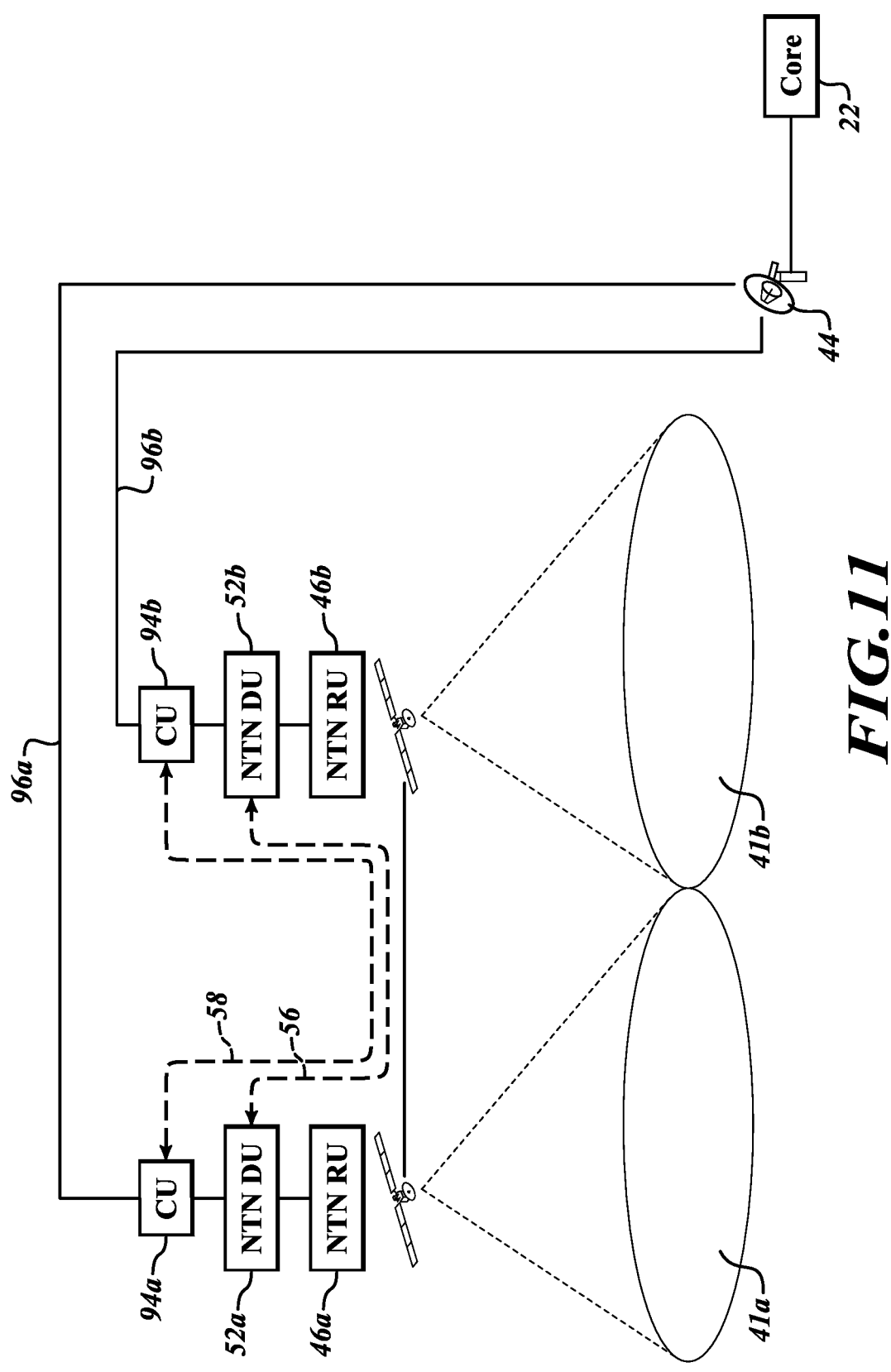
FIG. 11 illustrates the entire O-RAN system being in the ISL.

FIG. 11 provides a next generation advanced version of FIG. 10 in which the entire CU 94 is placed on the satellites. In the embodiment shown in FIG. 11, the entirety of the hardware and the software for each of the RU, DU and CU functions is within each satellite. Accordingly, satellite 30a includes an NTN RU 46a, NTN DU 52a, and CU 94a. In this embodiment, the respective CU functions 94 communicate using E2 protocols along lines 96a, 96b to Earth based transmitter and receiver 44 which communicates with the core 22 for the exchange of data across the entire network. As previously described with respect to FIG. 10 satellites 30a, 30b exchange data via the ISL along a link 56 that provides exchange between the DU units 52a, 52b and along a link 58 that provides an exchange of information between the CU 94a, 94b. In a preferred embodiment, the entirety of the CU 94 is carried out on the satellites, however in one alternative embodiment, a hybrid of the CU functions can be carried out. As will be appreciated, the CU function can consume large amounts of resources, both hardware and software. Accordingly, to save time and/or power even if sufficient hardware to perform the entire CU function is on the satellite 30, it can perform only a portion of the CU function, such as the user plane and then transmit to the Earth based transmitter and receiver 44 to have the remainder of the CU function carried out in an Earth based station 20b. This can be carried out at a selected point in time depending on latencies, bandwidths, resources available. At another selected point in time rather than split up the CU function between the satellite and the ground, the entire CU function can be carried out within a single satellite. Thus, the system has the capability to function with all of the CU set functions carried out within the satellite as shown in FIG. 11 or carry out only a part of the functions of the CU and transmit the signal to the Earth in order for an based network to carry out the other portions of the CU function depending on the location of the satellite, its capabilities, and the location of other satellites. A single satellite 30 may switch between the embodiment of FIG. 10 at a first point in time and then use the embodiment of FIG. 11 in which it performs all of the CU functions at another point in time and then switch back to the embodiment of FIG. 10.

Figure 12:
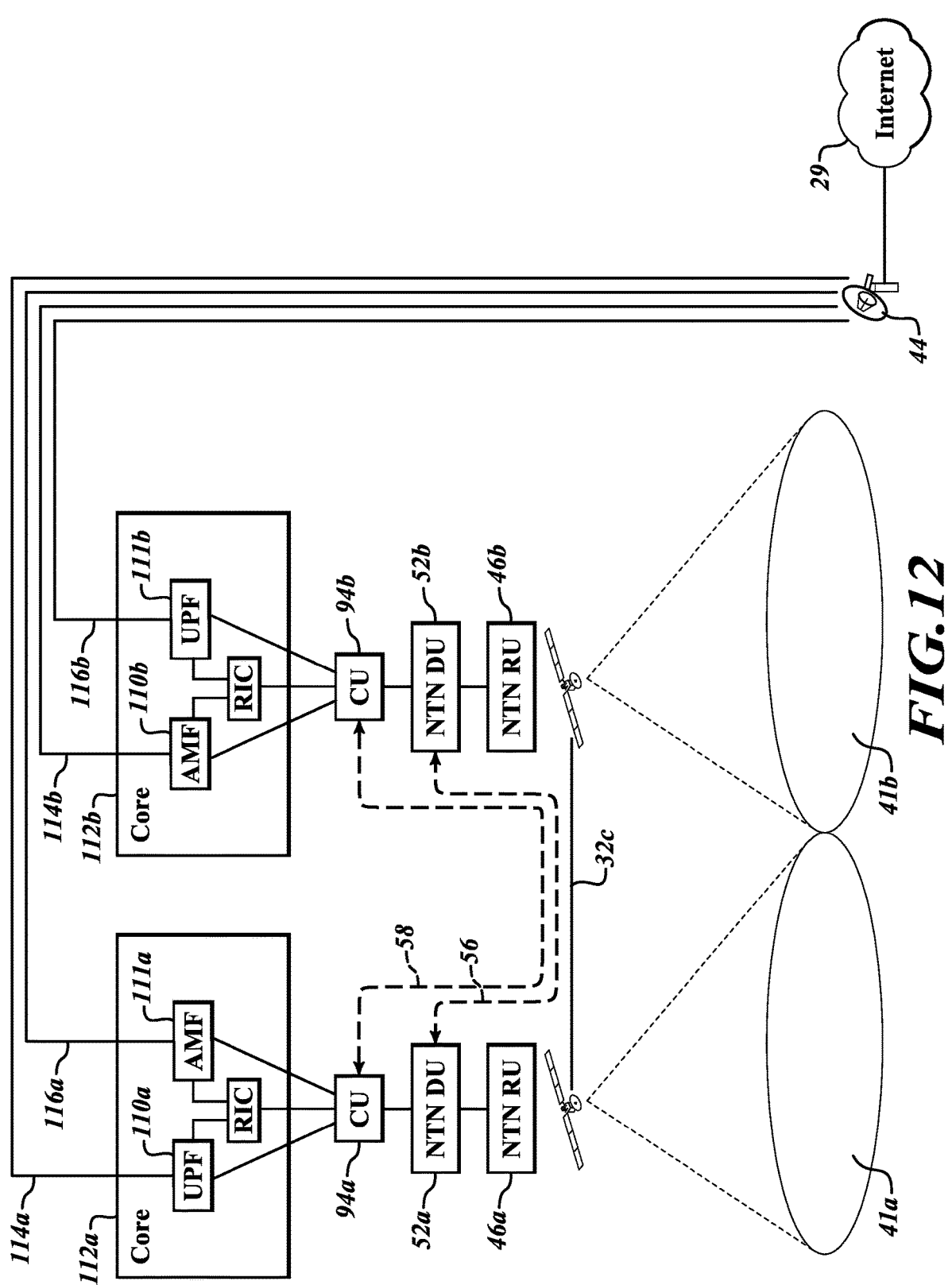
FIG. 12 illustrates the entire O-RAN as well as core inface in the ISL.

FIG. 12 provides an embodiment in which one or more satellites have significant hardware, software, and power capabilities. In this embodiment, one or more satellites have a portion of the core 112 carried out on the satellite itself. As the hardware and software capabilities of the satellites increase and the ability to launch heavier payloads into orbit around the Earth increases, some satellites may have sufficient capabilities to perform some or all core function of the O-RAN network. In the example shown in FIG. 12, a portion of the core 112a is positioned on the satellite which carries out the UPF 110 and AMF 111 within each respective satellite, shown as 110a and 111a in satellite 30a and as 110b and 111*b* in satellite 30*b*. Depending on the location of the various users as they communicate with each other and exchange data, it is entirely possible that all of the communication for the network will incur within a single satellite with no transmission to the Earth at any time other than an exchange between two users 10. For example, if both users are within the area 41*a*, then each of them can exchange using the RU protocol with the satellite 30*a* and then use the hardware and software capabilities of the DU, CU, and core functions on the satellite 30*a* and exchange data with each other without having communication links to any other hardware or software. This communication between two users 10 using a single satellite can occur for a selected time, when both are within the same service area 41*a*. Then, at a second point in time when the two users are in different line of sight areas 41 for different satellites, the first user can exchange data via satellite 30*b* and make use of the RU 46*b*, DU 52*b*, CU 94*b*, and core 112*b* on that particular satellite and exchange information along ISL links 56, 58 which also exchange information via the core along these links so that the communication occurs solely within two satellites that are within line of sight of each other even though each of the uses are in a different line of sight on the Earth. Further, if the communication or data exchange requires an exchange of information with the Internet 29 then one or more communication links between the core 112 of each of the respective satellites can be made to the Earth based transmitter and receiver 44 via various connection line such as 114*a*, 116*a*, as well as 114*b*, 116*b* in order to exchange information with other users on the Earth which are not within the line of sight of satellites 30*a*, 30*b*, or which do not have any communication to these respective satellites but are merely Earth based stations.

In the embodiment of FIG. 12, the ISL carries the inter-DU, X-n, as well as the N14 interfaces. This has the benefit that it could substantially enhance the intra-gNB communication links for the inter-DU and inter-CU, as well as various X-n and N14 handovers. The entire system operates substantially faster, with much lower latencies and higher data rates when a majority of the telecom network is carried out fully in satellites orbiting the Earth. As previously mentioned, satellites have a much lower latency as well as higher data rates in communications between them then most Earth based systems. Accordingly, forming a majority of the core telecom functions within the LEO satellites provides improved communication speeds with higher data rates. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of communicating information over an Open Radio Access Network (O-RAN) network having core functions, comprising:

transmitting a first set of information via radio waves between a first terrestrial based user equipment and a first satellite using a Radio Unit (RU) protocol of the O-RAN network;

transmitting the first set of information between the first satellite and a second satellite via an inter satellite link connection using a fronthaul protocol of the O-RAN network;

transmitting a second set of information via radio waves between a second terrestrial based user equipment and a third satellite using the RU protocol of the O-RAN network;

transmitting the second set of information between the third satellite and the second satellite via the inter satellite link connection using the fronthaul protocol of the O-RAN network;

routing the first and second sets of information to a terrestrial network by transmitting them between the second satellite and a terrestrial network receiver; and communicating the first and second sets of information between first and second users via a portion of the core functions of the O-RAN network carried out in the terrestrial network and a portion of the core functions of the O-RAN network being carried out in the second satellite.

2. The method of claim 1, further comprising:

exchanging the first set of information with the Internet in the terrestrial network.

3. The method of claim 1, further comprising:

carrying out a first set of O-RAN central unit functions in the second satellite prior to routing the first and second sets of information to the terrestrial network receiver.

4. The method of claim 3, further comprising:

carrying out a second set of O-RAN central unit functions in the terrestrial network after routing the first and second sets of information to the terrestrial network by the second satellite.

5. The method of claim 1, further comprising:

carrying out a first set of O-RAN distributed unit functions in the second satellite prior to routing the first and second sets of information to the terrestrial network.

6. The method of claim 5 wherein the first set of O-RAN distributed unit functions is all of the O-RAN distributed unit functions that are part of the O-RAN network.

7. The method of claim 5, wherein the first set of O-RAN distributed unit functions is a portion of the O-RAN distributed unit functions that are part of the O-RAN network, the method further including:

carrying out a second set of O-RAN distributed unit functions in the terrestrial network after routing the first and second sets of information to the terrestrial network by the second satellite.

8. A method of communicating information over an Open Radio Access Network (O-RAN) network, comprising:

transmitting a first set of information via radio waves between a first terrestrial based user equipment and a first satellite using a Radio Unit (RU) of the O-RAN network during a first time period when the first satellite is in a line of sight location with the first terrestrial based user equipment;

transmitting a second set of information between a second satellite and a terrestrial network receiver during the first time period when the second satellite is in a line of sight location with the terrestrial network receiver;

monitoring a movement of the first satellite relative to the terrestrial network receiver;

transmitting the first set of information between the first satellite and the second satellite via an inter satellite link connection when the first satellite is not in a line of sight location relative to the terrestrial network receiver;

transmitting the first set of information from the second
satellite to the terrestrial network receiver during a
second time period when the first satellite is not in a
line of sight location relative to the terrestrial network
receiver and the second satellite is in a line of sight
location with the terrestrial network receiver to provide
an exchange of the first set of information between the
first terrestrial based user equipment and the terrestrial
network; and continuing to exchange the first set of information
between the first terrestrial based user equipment and
the terrestrial network via the first satellite and via the
second satellite during a third time period when the first
satellite is in a line of sight location relative to the
terrestrial network receiver and the second satellite is in
a line of sight location with the terrestrial network
receiver.

9. The method of claim 8, further including:

determining that first satellite has moved in an orbit
around the earth between the first time period and the
third time period to be in location in which it the first
satellite is not in a line of sight location with the
terrestrial network receiver during the third time
period.

10. The method of claim 8, further including:

determining that the location of the first satellite during
the first time period is in a line of sight relative to the
terrestrial network receiver;

determining a speed of the first satellite relative to the
earth;

calculating an expected time when the first satellite will
no longer be in a line of sight with the terrestrial
network receiver;

determining that the first satellite will no longer be in a
line of sight with the terrestrial network receiver during
the third time period; and

performing the exchange of the first set of information
between the first terrestrial based user equipment and
the terrestrial network via the first satellite and via
second satellite for all of the first set of information.

11. The method of claim 8, further including:

determining that the location of the first satellite during
the first time period is in a line of sight relative to the
terrestrial network receiver;

exchanging a portion of the first set of information
directly between the first satellite and the terrestrial
network receiver while the first satellite is in a line of
sight relative to the terrestrial network receiver;

determining that the location of the first satellite relative
to the earth is no longer in a line of sight with the
terrestrial network receiver; and exchanging a second portion of the first set of information
between the first terrestrial based user equipment and
the terrestrial network via the first satellite and via the
second satellite during the second time period when the
first satellite is in a line of sight with the first terrestrial
based user equipment but is not in a line of sight with
the terrestrial network receiver.

12. The method of claim 8 wherein an orbit period of the
first satellite is shorter than an orbit period of the second
satellite.

13. The method of claim 12 wherein the orbit period of the
first satellite is shorter than 2 hours and the orbit period of
the second satellite is longer than 12 hours.

14. The method of claim 12 wherein the orbit period of the
first satellite is shorter than 2 hours and the orbit period of
the second satellite is longer than 2 hours and less than 3
hours.

* * * * *